(12) United States Patent
Arbel et al.

(10) Patent No.: US 8,978,018 B2
(45) Date of Patent: Mar. 10, 2015

(54) REVERSIBLY INSTRUMENTING A COMPUTER SOFTWARE APPLICATION

(75) Inventors: David Arbel, Michmoret (IL); Amit Gefner, Ramat-Gan (IL); Eran Gery, Modiin (IL); Ehud Hoggeg, Ashdod (IL); Beery Holstein, Herzelliya (IL); Alexander Rekhter, Ashdod (IL)

(73) Assignee: International Business Machines Corporation, Armonk, NY (US)

( * ) Notice: Subject to any disclaimer, the term of this patent is extended or adjusted under 35 U.S.C. 154(b) by 1048 days.

(21) Appl. No.: 12/958,939

(22) Filed: Dec. 2, 2010

(65) Prior Publication Data

US 2012/0144375 A1 Jun. 7, 2012

(51) Int. Cl.
*G06F 9/44* (2006.01)
*G06F 11/36* (2006.01)

(52) U.S. Cl.
CPC ........ *G06F 11/3644* (2013.01); *G06F 11/3636* (2013.01); *G06F 11/3624* (2013.01)
USPC ............................................ 717/130; 714/35

(58) Field of Classification Search
CPC .................................... G06F 11/3466–11/3644
USPC ...................... 717/101–178; 714/35
See application file for complete search history.

(56) References Cited

U.S. PATENT DOCUMENTS

| 5,940,618 | A | 8/1999 | Blandy et al. |
| 6,106,571 | A | 8/2000 | Maxwell |
| 6,126,330 | A | 10/2000 | Knight et al. |
| 6,216,237 | B1 | 4/2001 | Klemm et al. |

(Continued)

FOREIGN PATENT DOCUMENTS

| CN | 101004676 | 1/2006 |
| EP | 1552385 A1 * | 7/2005 |

OTHER PUBLICATIONS

The Role of Instrumentation and Mapping in Performance Measurement—Sameer Suresh Shende—Presented to the Department of Computer and Information Science and the Graduate School of the University of Oregon—Aug. 2001.*

(Continued)

*Primary Examiner* — Lewis A Bullock, Jr.
*Assistant Examiner* — Francisco Aponte
(74) *Attorney, Agent, or Firm* — Holland & Knight LLP; Brian J. Colandreo, Esq.; Jeffrey T. Placker, Esq.

(57) ABSTRACT

A method, system, and computer program product for reversibly instrumenting a computer software application is described. The method may comprise creating a map indicating a plurality of locations of application instruction sections within instructions of a computer software application. The method may further comprise inserting a plurality of instrumentation sections into the computer software application instructions. The method may also comprise updating the map to indicate the locations of the instrumentation sections within the computer software application instructions, where the indications in the map of the locations of the instrumentation sections are distinguishable from the indications in the map of the locations of the application instruction sections. The method may additionally comprise updating the map to indicate a change in any of the locations of any of the application instruction sections within the computer software application instructions subsequent to inserting the instrumentation sections.

20 Claims, 9 Drawing Sheets

(56) References Cited

U.S. PATENT DOCUMENTS

| | | | |
|---|---|---|---|
| 6,332,213 B1 | 12/2001 | Grossman et al. | |
| 6,353,924 B1* | 3/2002 | Ayers et al. | 717/128 |
| 6,470,493 B1* | 10/2002 | Smith et al. | 717/130 |
| 6,513,154 B1* | 1/2003 | Porterfield | 717/101 |
| 6,662,358 B1* | 12/2003 | Berry et al. | 717/128 |
| 6,918,110 B2 | 7/2005 | Hundt et al. | |
| 6,934,942 B1* | 8/2005 | Chilimbi | 717/158 |
| 7,017,153 B2* | 3/2006 | Gouriou et al. | 717/158 |
| 7,047,521 B2* | 5/2006 | Bunnell | 717/130 |
| 7,114,150 B2 | 9/2006 | Dimpsey et al. | |
| 7,168,068 B2 | 1/2007 | Dawson | |
| 7,174,536 B1 | 2/2007 | Kothari et al. | |
| 7,178,131 B2 | 2/2007 | Mitchell et al. | |
| 7,240,335 B2 | 7/2007 | Angel et al. | |
| 7,464,373 B1 | 12/2008 | Yunt et al. | |
| 7,478,371 B1* | 1/2009 | Gove | 717/128 |
| 7,484,205 B2 | 1/2009 | Venkatapathy | |
| 7,805,717 B1* | 9/2010 | Spertus et al. | 717/158 |
| 7,823,134 B2* | 10/2010 | Agarwal et al. | 717/127 |
| 8,745,596 B2* | 6/2014 | Maybee | 717/130 |
| 2003/0014737 A1* | 1/2003 | Smith et al. | 717/130 |
| 2003/0115583 A1* | 6/2003 | Hundt et al. | 717/158 |
| 2004/0133882 A1* | 7/2004 | Angel et al. | 717/130 |
| 2004/0163077 A1* | 8/2004 | Dimpsey et al. | 717/130 |
| 2004/0168156 A1* | 8/2004 | Hundt et al. | 717/130 |
| 2005/0223357 A1* | 10/2005 | Banerjee et al. | 717/120 |
| 2005/0229165 A1* | 10/2005 | Ma et al. | 717/130 |
| 2006/0294503 A1* | 12/2006 | Henderson et al. | 717/131 |
| 2007/0168998 A1* | 7/2007 | Mehta et al. | 717/130 |
| 2007/0209031 A1* | 9/2007 | Ortal et al. | 717/104 |
| 2007/0261034 A1 | 11/2007 | Chen et al. | |
| 2008/0082969 A1* | 4/2008 | Agha et al. | 717/130 |
| 2009/0125877 A1 | 5/2009 | Kuzsma et al. | |
| 2010/0037211 A1* | 2/2010 | Zakonov et al. | 717/130 |
| 2011/0283263 A1* | 11/2011 | Gagliardi et al. | 717/130 |
| 2012/0011491 A1* | 1/2012 | Eldar | 717/130 |

OTHER PUBLICATIONS

Dynamic Instrumentation of Threaded Applications—Zhichen Xu Barton P. Miller, Oscar Naim—Computer Sciences Department University of Wisconsin, Oracle Corporation—1998.*

Dynamic Instrumentation of Threaded Applications—Zhichen Xu Barton P. Miller—Computer Sciences Department University of Wisconsin Madison, WI—Oscar Naim—Oracle Corporation—1999.*

The Role of Instrumentation and Mapping in Performance Measurement—Sameer Suresh Shende A Dissertation Presented to the Department of Computer and Information Science and the Graduate School of the University of Oregon in partial fulfillment of the requirements for the degree of Doctor of Philosophy Aug. 2001.*

JScoper: Eclipse support for Research on Scoping and Instrumentation for Real Time Java Applications Andr'es Ferrari, Diego Garbervetsky, Victor Braberman, Pablo Listingart, Sergio Yovine—eclipse'05, Oct. 16-17, 2005, San Diego, CA.*

Tikir et al., "Efficient Instrumentation for Code Coverage Testing," 2002 ACM, http://portal.acm.org/citation.cfm?id=566172.566186; Computer Science Department, University of Maryland, College Park, MD 20742, pp. 1-11.

OC, Systems, "Aprobe is a Powerful Software Instrumentation Technology", 1999-2010 OC Systems; URL:http://www.ocsystems.com/softwareinstrumentation.html.

Daniela da Cruz et al., "Code Inspection Approaches for Program Visualization", Acta Electrotechnica et Informatica, vol. 9, No. 3, 2009, 32-42. URL:http://www.aei.tuke.sk/pdf/2009-03/05_Cruz.pdf.

John Panzer, "Automatic Code Instrumentation", 1998; URL:http://www.johnpanzer.com/aci_cuj/index.html.

Hasso Plattner Institut, IT Systems Engineering, HPI CGS: Software Visualization, http://www.hpi.uni-potsdam.de/doellner/research/softvis.html, downloaded Feb. 2, 2010, pp. 1-2.

* cited by examiner

```
01 #ifndef Car_H
02 #define Car_H
03
04
05 class Car {
06 public :
07
08     bool Drive(const CString & driver);
09
10 private :
11
12     int color;
13 };
14
15 #endif
16
```

REVERSIBLY INSTRUMENTING A COMPUTER SOFTWARE APPLICATION

FIELD OF THE INVENTION

The invention relates to computer software analysis and design in general.

BACKGROUND OF THE INVENTION

Developers of computer software applications may use tools to create models of their applications. Developers may begin developing an application by first creating a model of the application, and then using tools to automatically generate computer software application code from the model. In other instances, such as where developers work with pre-existing legacy application code, developers may use tools to create a model of an application based on the pre-existing code. Unfortunately, not all aspects of the pre-existing code may be reflected in the model. Furthermore, once a model of an application and the application code are in hand, a developer may wish to make changes to the code and have them reflected in the model, and vice versa, yet not all changes that are made to the code may be reflected in the model. Thus, if the model is used to regenerate the code entirely, such as when instrumenting the code to include instructions that are used to monitor the behavior of the application during execution, as well as when removing such instrumentation, any aspects of the code that are not reflected in the model may be overwritten.

SUMMARY OF THE INVENTION

In one aspect of the invention a method may be provided for reversibly instrumenting a computer software application. The method may include creating a map indicating a plurality of locations of application instruction sections within instructions of a computer software application. The method may further include inserting a plurality of instrumentation sections into the computer software application instructions. The method may also include updating the map to indicate the locations of the instrumentation sections within the computer software application instructions, where the indications in the map of the locations of the instrumentation sections may be distinguishable from the indications in the map of the locations of the application instruction sections. The method may additionally include updating the map to indicate a change in any of the locations of any of the application instruction sections within the computer software application instructions subsequent to inserting the instrumentation sections. The map may be consulted to facilitate the removal of the instrumentation sections from the computer software application instructions, and thereafter the map may be updated.

A system and computer program product embodying the invention may also be provided.

BRIEF DESCRIPTION OF THE DRAWINGS

The invention will be understood and appreciated more fully from the following detailed description taken in conjunction with the appended drawings in which:

FIGS. 2A-2F are simplified code and mapping examples that demonstrate aspects of the system of FIG. 1, constructed and operative in accordance with an embodiment of the invention;

DETAILED DESCRIPTION OF THE INVENTION

Figure 1:
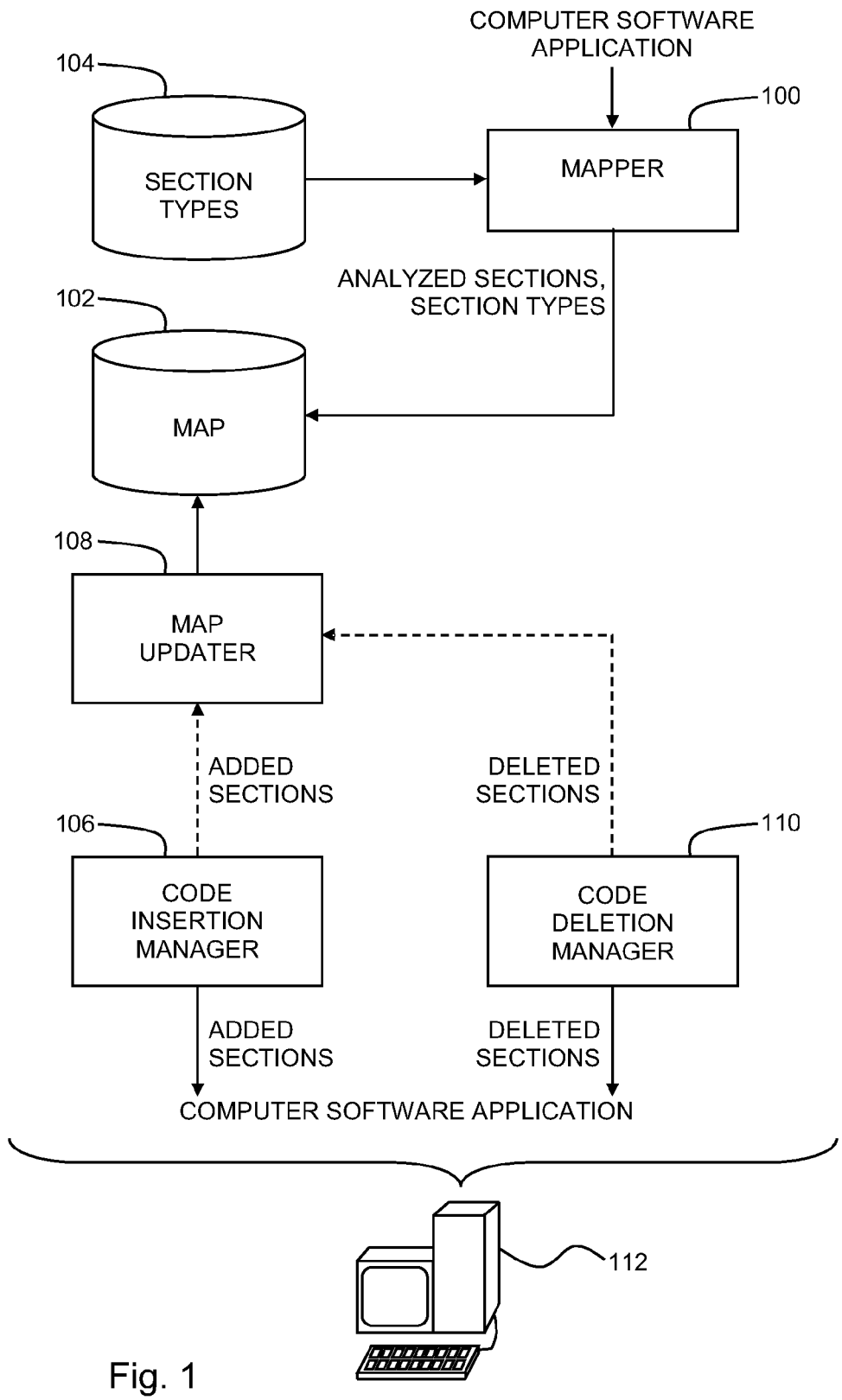
FIG. 1 is a simplified conceptual illustration of a system for reversibly instrumenting a computer software application, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1 which is a simplified conceptual illustration of a system for reversibly instrumenting a computer software application, constructed and operative in accordance with an embodiment of the invention. In the system of FIG. 1, a mapper 100 may be configured to create a map 102 of the instructions of a computer software application, such as where the instructions are in the form of source code or bytecode, where map 102 may indicate the locations of one or more sections of application instructions. Mapper 100 may typically express the location of an application instruction section as a pair of numbers, such as corresponding to the line numbers of the first and last instructions of the application instruction section relative to the first instruction in a data file, or to the line number of the first instruction of the application instruction section and the number of instructions in the section. Mapper 100 may also indicate the type of each section within map 102, such as being of any one of a number of predefined section types 104. Section types 104 may, for example, be used to distinguish between instruction sections that are represented by corresponding elements in a model of the computer software application, which may include public classes, private classes, function calls, and preprocesser commands, and those that do not, such as instrumentation instruction sections as will be described hereinbelow.

A code insertion manager 106 may be configured to insert into the computer software application instructions one or more instrumentation sections of instructions, such as in order to monitor the behavior of the application during execution. Code insertion manager 106 may mark the boundaries of each instrumentation section within the computer software application instructions, such as with "//Begin Instrumentation" and "//End Instrumentation" comments that may be part of an instrumentation section.

A map updater 108 may be configured to update map 102 to include the instrumentation sections and to indicate the locations of the instrumentation sections within the computer software application instructions. Map updater 108 may typically express the location of an instrumentation section in the same manner as the application instruction sections, but where the indications in map 102 of the locations of the instrumentation sections are distinguishable from the indications in map 102 of the locations of the application instruction sections. This may, for example, by accomplished by indicating within map 102 that the instrumentation sections are of a different section type than those of the application instruction sections, such as where the instrumentation sections are indicated in map 102 as being instrumentation-type sections, whereas the application instruction sections are indicated in map 102 as being of section types other than instrumentation-type sections. Map updater 108 may also be configured to update map 102 to indicate a change in any of the locations of any of the application instruction sections within the computer software application instructions subsequent to any instrumentation sections being inserted into the computer software application instructions, either by code insertion manager 106 or manually.

A code deletion manager 110 may be configured to remove any of the instrumentation sections from the computer software application instructions by consulting map 102. For example, code deletion manager 110 may remove any instrumentation sections that had been inserted into the computer software application instructions, such as when testing of the computer software application is completed. Map updater 108 may be configured to update map 102 to remove the locations of the removed instrumentation sections, and to indicate a change in any of the locations of any of the application instruction sections within the computer software application instructions subsequent to the instrumentation sections being removed from the computer software application instructions.

Map updater 108 may also be configured to update map 102 as described hereinabove to reflect any modifications made to application instruction sections and/or instrumentation sections that result in any changes in the number of lines of the instructions of any of the sections and/or to the locations of any of the sections. This includes modifications that are made directly to the instructions of the computer software application, as well as modifications that are made to a model of the computer software application that are then automatically made to the instructions of the computer software application using known techniques. Map updater 108 may be configured to detect manual changes made to instrumentation sections within the computer software application instructions, such as changes in their locations, by identifying instrumentation section boundary markings within the computer software application instructions, and to update map 102 accordingly.

Any of the elements shown in FIG. 1 may be executed by or otherwise made accessible to a computer 112, such as by implementing any of the elements in computer hardware and/or in computer software embodied in a physically-tangible, computer-readable medium in accordance with conventional techniques.

Figure 2B:
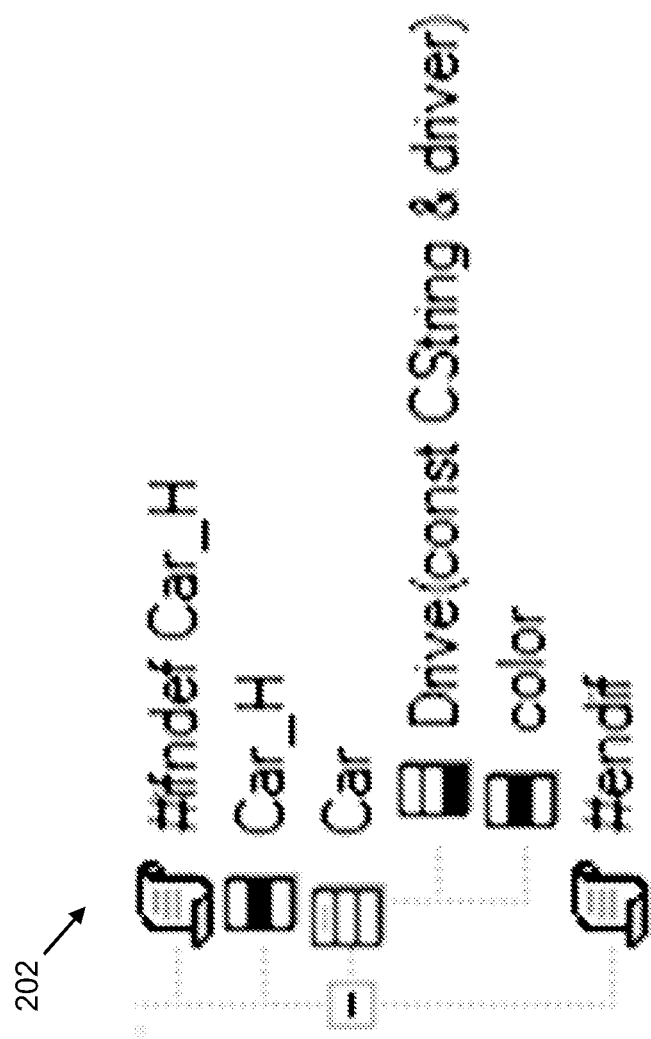
Figure 2C:
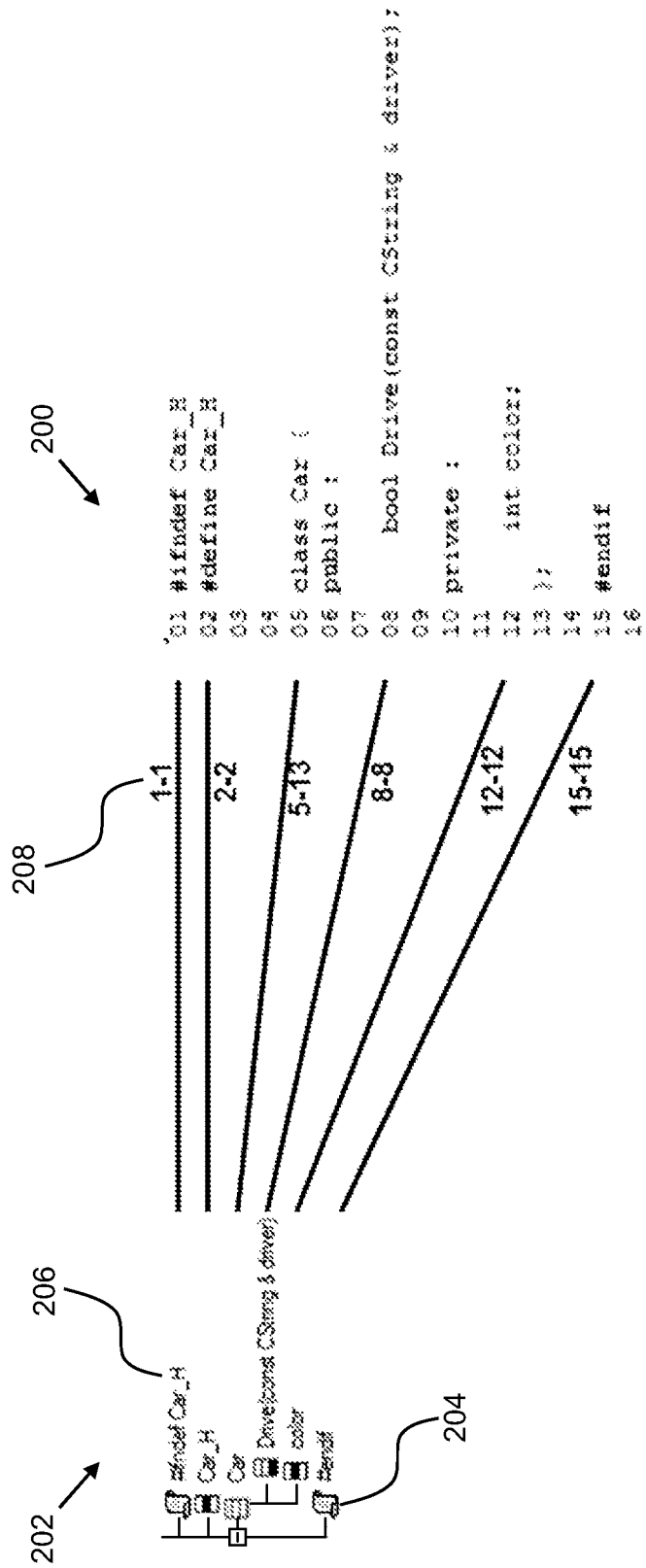

The system of FIG. 1 may be appreciated in the context of an exemplary operational scenario with reference to FIGS. 2A-2F. In FIG. 2A a simplified set of instructions 200 of a computer software application may be shown, of which a map 202 may be created as shown in FIG. 2B. Map 202 may be created as described hereinabove with reference to FIG. 1, where, as shown in FIG. 2C, different sections 204 of the set of instructions 200 may be represented in map 202 with icons 206 representing various section types. The location of each section 204 in the set of instructions 200 may be represented in map 202 by mapping the section 204 to starting and ending line numbers 208 of each section 204 in the set of instructions 200 as follows:

The "#ifndef Car_H" section location is: start:=1, end:=1
The "Car_H" global Variable section location is: start:=2, end:=2
The "Car" Class section location is: start:=5, end:=13
The "Drive" Operation section location is: start:=8, end:=8
The "color" Attribute section location is: start:=12, end:=12
The "#endif" section location is: start:=15, end:=15

Figure 2D:
Figure 2E:
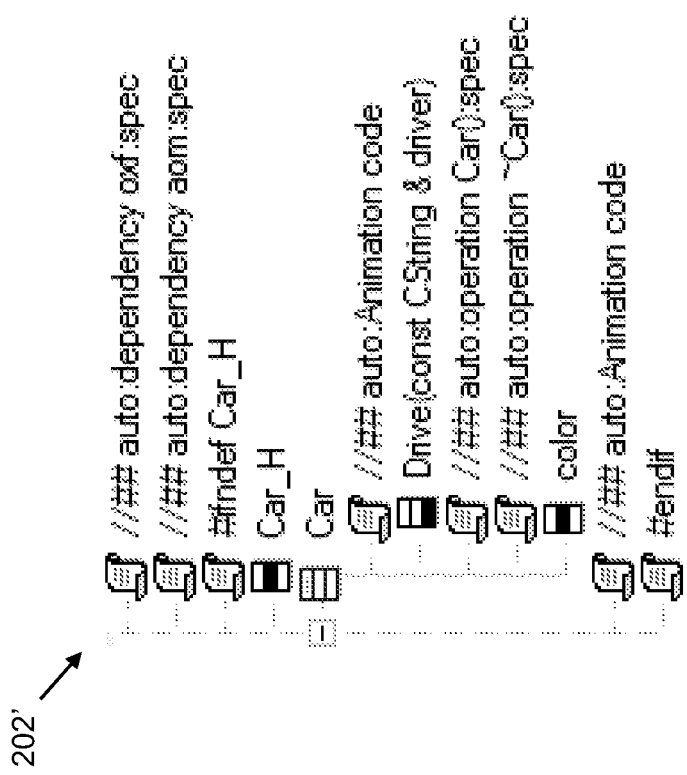
Figure 2F:
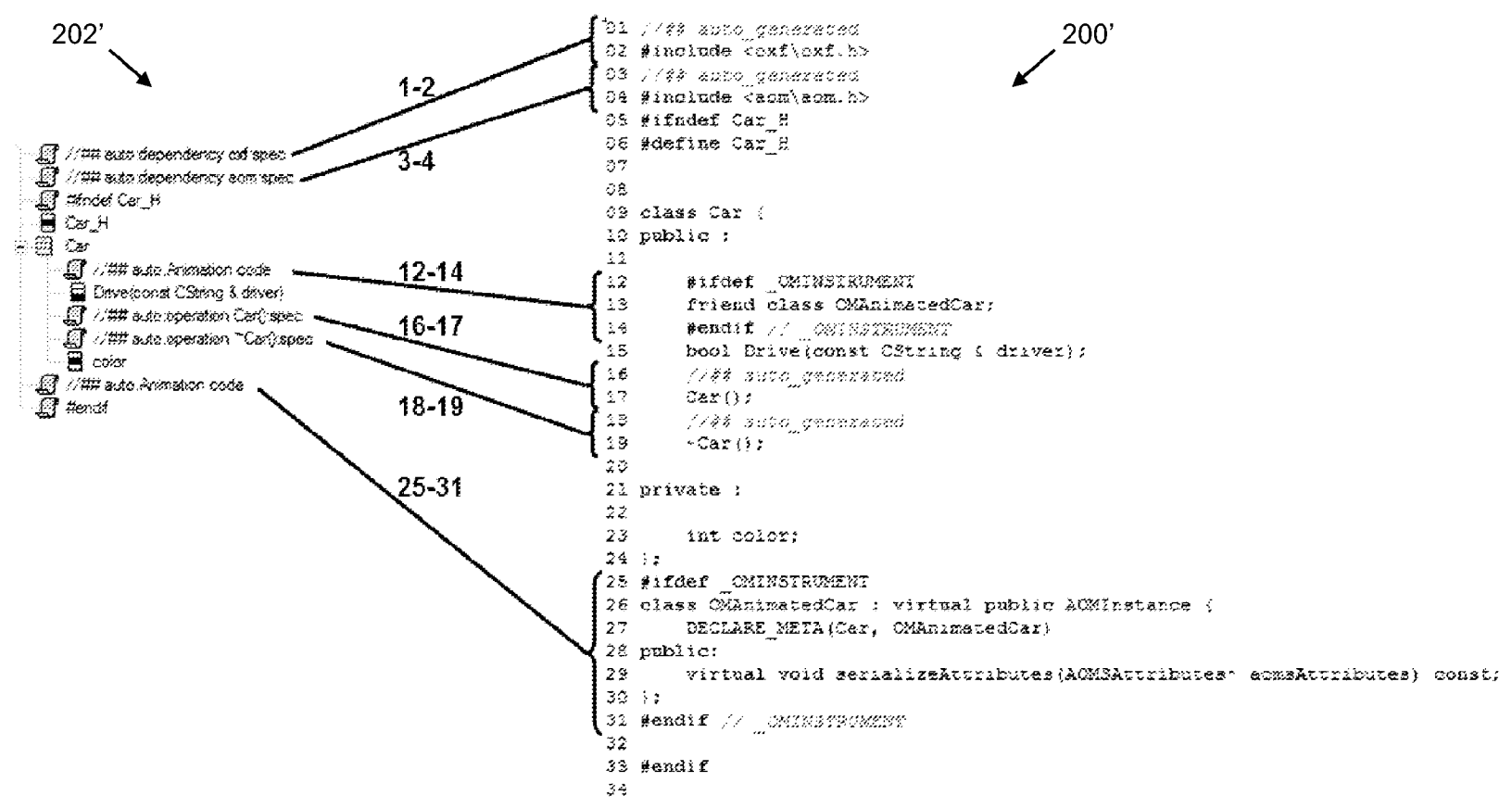

In FIG. 2D the set of instructions 200 may be shown as a set of instructions 200' after the insertion of instrumentation instructions. In FIG. 2E map 202 may be shown as a map 202' after being updated to represent the inserted sections of instrumentation instructions. As shown in FIG. 2F, the location of each inserted section may be represented in map 202', and the locations of the previous sections may be updated as follows:

The "#ifndef Car_H" section location is: start:=5, end:=5
The "Car_H" global Variable section location is: start:=6, end:=6
The "Car" Class section location is: start:=9, end:=24
The "Drive" Operation section location is: start:=15, end:=15
The "color" Attribute section location is: start:=23, end:=23
The "#endif" section location is: start:=33, end:=33

Figure 3:
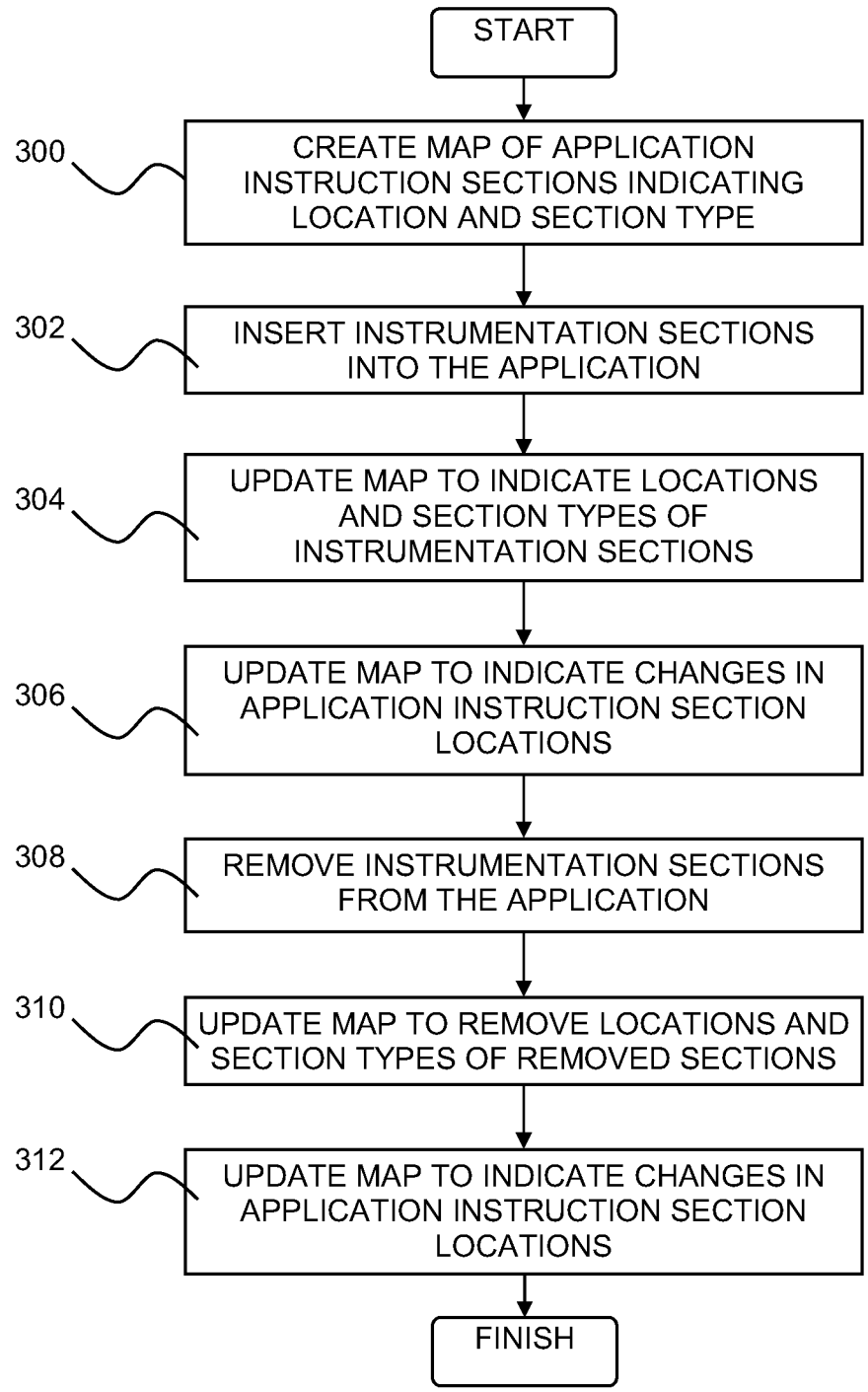
FIG. 3 is a simplified flowchart illustration of an exemplary method of operation of the system of FIG. 1, operative in accordance with an embodiment of the invention.

Reference is now made to FIG. 3 which is a simplified flowchart illustration of an exemplary method of operation of the system of FIG. 1, operative in accordance with an embodiment of the invention. In the method of FIG. 3, a map of the instructions of a computer software application may be created, where sections of application instructions, their locations within the application instructions, and their section types may be indicated (operation 300). One or more sections of instrumentation instructions may be inserted into the computer software application instructions, such as instrumentation code that may be automatically inserted by an application development tool (operation 302). The map may be updated to include the instrumentation sections and indicate the locations of the instrumentation sections within the computer software application instructions (operation 304). The map may be updated to indicate a change in any of the locations of any of the application instruction sections within the computer software application instructions subsequent to any instrumentation sections being inserted into the computer software application instructions (operation 306). Any of the instrumentation sections may be removed from their locations within the computer software application instructions as indicated by the map, such as when a developer wishes to have all instrumentation sections automatically removed from the application instructions (operation 308). The map may be updated to remove the locations of the removed instrumentation sections (operation 310), and to indicate a change in any of the locations of any of the application instruction sections within the computer software application instructions subsequent to the instrumentation sections being removed from the computer software application instructions (operation 312).

Figure 4:
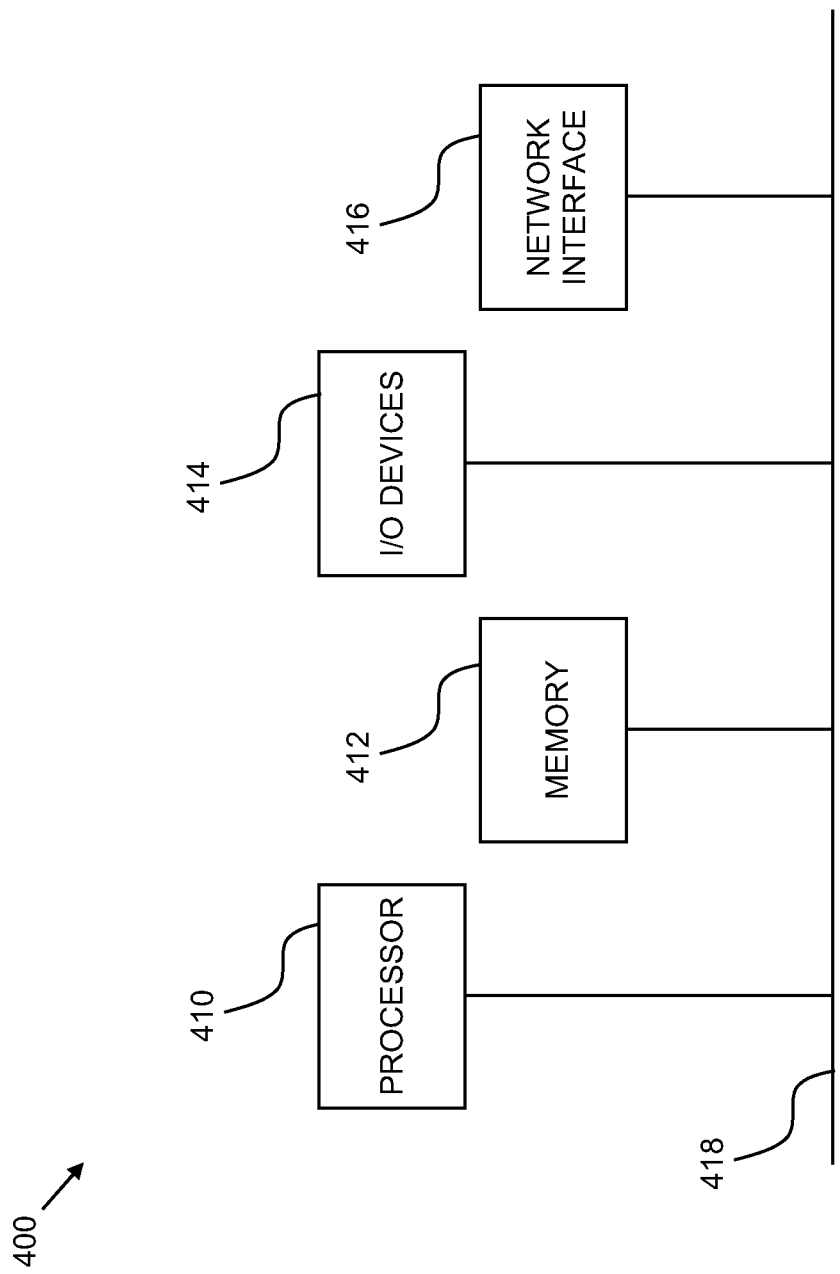
FIG. 4 is a simplified block diagram illustration of an exemplary hardware implementation of a computing system, constructed and operative in accordance with an embodiment of the invention.

Referring now to FIG. 4, block diagram 400 illustrates an exemplary hardware implementation of a computing system in accordance with which one or more components/methodologies of the invention (e.g., components/methodologies described in the context of FIGS. 1-3) may be implemented, according to an embodiment of the invention.

As shown, the techniques for controlling access to at least one resource may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for reversibly instrumenting a computer software application, the method comprising:
    creating a map indicating a plurality of locations of application instruction sections within instructions of a computer software application;
    inserting a plurality of instrumentation sections into the computer software application instructions;
    updating the map to indicate the locations of the instrumentation sections within the computer software application instructions, wherein the indications in the map of the locations of the instrumentation sections are distinguishable from the indications in the map of the locations of the application instruction sections;
    updating the map to indicate a change in any of the locations of any of the application instruction sections within the computer software application instructions subsequent to inserting the instrumentation sections;
    marking boundaries of the instrumentation sections within the computer software application instructions; and
    performing any of the updating operations subsequent to detecting a change made to any of the instrumentation sections within the computer software application instructions by identifying the instrumentation section boundary markings within the computer software application instructions and updating the map to reflect the identified instrumentation section boundary markings;
    wherein the plurality of locations of application instruction sections are represented in the map by a starting line number and an ending line number for each one of the plurality of application instruction sections.

2. The method according to claim 1 and further comprising:
    removing any of the instrumentation sections from the computer software application instructions;
    updating the map to remove the locations of the removed instrumentation sections; and
    updating the map to indicate a change in any of the locations of any of the application instruction sections within the computer software application instructions subsequent to removing the instrumentation sections.

3. The method according to claim 2 wherein the removing operation further comprises removing any of the instrumentation sections from the computer software application instructions as indicated by the locations of the instrumentation sections within the map.

4. The method according to claim 1 and further comprising indicating within the map different section types for the application instruction sections than for the instrumentation sections.

5. The method according to claim 1 and further comprising performing any of the updating operations subsequent to any of the application instruction sections being manually modified.

6. The method according to claim 1 and further comprising performing any of the updating operations subsequent to a model of the computer software application being manually modified.

7. The method of claim 1 wherein the marking operation further comprises
    marking part of the instrumentation sections.

8. A system for reversibly instrumenting a computer software application, the system comprising:
    at least one processor device and at least one memory architecture coupled with the at least one processor device;
    a mapper configured to create a map indicating a plurality of locations of application instruction sections within instructions of a computer software application;
    a code insertion manager configured to insert a plurality of instrumentation sections into the computer software application instructions;
    a map updater configured to:
        update the map to indicate the locations of the instrumentation sections within the computer software application instructions, wherein the indications in the map of the locations of the instrumentation sections are distinguishable from the indications in the map of the locations of the application instruction sections,
    wherein different sections are represented on the map by visual icons representing different section types;
        update the map to indicate a change in any of the locations of any of the application instruction sections within the computer software application instructions subsequent to inserting the instrumentation sections;
        wherein the code insertion manager is further configured to mark boundaries of the instrumentation sections within the computer software application instructions; and
        wherein the map updater is further configured to update the map subsequent to detecting a change made to any of the instrumentation sections within the computer software application instructions by identifying the instrumentation section boundary markings within the computer software application instructions and updating the map to reflect the identified instrumentation section boundary markings;
    wherein the plurality of locations of application instruction sections are represented in the map by a starting line number and an ending line number for each one of the plurality of application instruction sections.

9. The system according to claim 8 and further comprising a code deletion manager configured to remove any of the instrumentation sections from the computer software application instructions, wherein the map updater is further configured to:
    update the map to remove the locations of the removed instrumentation sections, and
    update the map to indicate a change in any of the locations of any of the application instruction sections within the computer software application instructions subsequent to removing the instrumentation sections.

10. The system according to claim 9 wherein the map updater is further configured to remove any of the instrumentation sections from the computer software application instructions as indicated by the locations of the instrumentation sections within the map.

11. The system according to claim 8 wherein the map updater is further configured to indicate within the map different section types for the application instruction sections than for the instrumentation sections.

12. The system according to claim 8 wherein the map updater is further configured to update the map subsequent to any of the application instruction sections being manually modified.

13. The system according to claim 8 wherein the map updater is further configured to update the map subsequent to a model of the computer software application being manually modified.

14. The system of claim 8 wherein the code insertion manager is further configured to mark part of the instrumentation sections.

15. A computer program product for reversibly instrumenting a computer software application, the computer program product comprising:
   a non-transitory computer-readable storage medium; and
   computer-readable program code embodied in the computer-readable storage medium, wherein the computer-readable program code is configured to:
      create a map indicating a plurality of locations of application instruction sections within instructions of a computer software application,
      insert a plurality of instrumentation sections into the computer software application instructions,
      update the map to indicate the locations of the instrumentation sections within the computer software application instructions, wherein the indications in the map of the locations of the instrumentation sections are distinguishable from the indications in the map of the locations of the application instruction sections,
      update the map to indicate a change in any of the locations of any of the application instruction sections within the computer software application instructions subsequent to inserting the instrumentation sections;
      mark boundaries of the instrumentation sections within the computer software application instructions; and
      perform any of the update operations subsequent to detecting a change made to any of the instrumentation sections within the computer software application instructions by identifying the instrumentation section boundary markings within the computer software application instructions and update the map to reflect the identified instrumentation section boundary markings;
   wherein the plurality of locations of application instruction sections are represented in the map by a starting line number and an ending line number for each one of the plurality of application instruction sections.

16. The computer program product according to claim 15 wherein the computer-readable program code is further configured to:
   remove any of the instrumentation sections from the computer software application instructions,
   update the map to remove the locations of the removed instrumentation sections, and
   update the map to indicate a change in any of the locations of any of the application instruction sections within the computer software application instructions subsequent to removing the instrumentation sections.

17. The computer program product according to claim 16 wherein the computer-readable program code is further configured to remove any of the instrumentation sections from the computer software application instructions as indicated by the locations of the instrumentation sections within the map.

18. The computer program product according to claim 15 wherein the computer-readable program code is further configured to indicate within the map different section types for the application instruction sections than for the instrumentation sections.

19. The computer program product according to claim 15 wherein the computer-readable program code is further configured to update the map subsequent to any of the application instruction sections being manually modified.

20. The computer program product according to claim 15 wherein the computer-readable program code is further configured to update the map subsequent to a model of the computer software application being manually modified.

* * * * *